US012074657B2

(12) United States Patent
Krief et al.

(10) Patent No.: US 12,074,657 B2
(45) Date of Patent: Aug. 27, 2024

(54) METHOD FOR PDP ESTIMATION IN FREQUENCY DOMAIN

(71) Applicant: Nokia Solutions and Networks Oy, Espoo (FI)

(72) Inventors: Patrick Albert Krief, Savigny sur Orge (FR); Ben Rached Nidham, Paris (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/545,623

(22) Filed: Dec. 19, 2023

(65) Prior Publication Data

US 2024/0214091 A1    Jun. 27, 2024

(30) Foreign Application Priority Data

Dec. 21, 2022  (FI) ...................................... 20226148

(51) Int. Cl.
*H04B 17/364* (2015.01)
*H04B 7/0413* (2017.01)
*H04L 25/02* (2006.01)

(52) U.S. Cl.
CPC ....... *H04B 17/364* (2015.01); *H04L 25/0212* (2013.01); *H04L 25/0224* (2013.01); *H04B 7/0413* (2013.01)

(58) Field of Classification Search
CPC ................ H04B 17/364; H04B 7/0413; H04L 25/0212; H04L 25/0224
See application file for complete search history.

(56) References Cited

U.S. PATENT DOCUMENTS

| 2010/0260248 A1 | 10/2010 | Hung et al. |
| 2015/0229493 A1 | 8/2015 | Lee et al. |
| 2021/0058273 A1 | 2/2021 | Yuan et al. |
| 2022/0060267 A1 | 2/2022 | Zhou et al. |

OTHER PUBLICATIONS

Kwon, H. Learning-based Power Delay Profile Estimation for 5G NR via Advantage Actor-Critic (A2C). In: 2022 IEEE 95th Vehicular Technology Conference (VTC2022—Spring). IEEE, Jun. 19, 2022 [retrieved on Apr. 27, 2023].
Finnish Search Report for Finnish patent application No. 20226148 dated May 2, 2023.
Finnish Office Action for Finnish patent application No. 20226148 dated May 2, 2023.
Search Report for European Application No. 23218793.0 dated Jun. 4, 2024.

(Continued)

*Primary Examiner* — Natasha W Cosme
(74) *Attorney, Agent, or Firm* — Harness, Dickey & Pierce, P.L.C.

(57) ABSTRACT

At least one embodiment relates to power delay profile (PDP) estimation e.g. in 5G systems for channel estimation and for demodulation. The power delay profile is estimated directly in the frequency domain using LMMSE properties based on the knowledge of channel statistics. An example embodiment applies an approximation by estimating the second order statistics of the channel autocorrelation function in time domain represented by the variance of the derivative of raw channel estimates in frequency domain.

20 Claims, 7 Drawing Sheets

(56) References Cited

OTHER PUBLICATIONS

Kun-Chien Hung et al.:, "Pilot-Based LMMSE Channel Estimation for OFDM Systems With Power-Delay Profile Approximation," IEEE Transactions On Vehicular Technology, IEEE, USA, vol. 59, No. 1, Jan. 1, 2010 (Jan. 1, 2010), pp. 150-159, XP011295053.
Hsieh Chia-Yu et al.: "LMMSE-Based Channel 1-11 Estimation for LTE-Advanced MIMO Downlink Employing UE-Specific Reference Signals," 2015 IEEE 81st Vehicular Technology Conference (VTC Spring), IEEE, May 11, 2015 (May 11, 2015), pp. 1-5, XP033167384.

METHOD FOR PDP ESTIMATION IN FREQUENCY DOMAIN

CROSS-REFERENCE TO RELATED APPLICATIONS

This application claims priority to and the benefit of Finnish Patent Application No. 20226148 filed on Dec. 21, 2022, the entire contents of each of which are incorporated herein by reference.

TECHNICAL FIELD

The present invention relates generally to cellular radio networks and their implementation. Concerning different generations of technology, the present invention may relate to any of the following: 2G, 3G, 4G, 5G or 6G access networks.

BACKGROUND

Today's and future wireless communication systems, such as Long-Term Evolution (LTE) or $5^{th}$ Generation (5G), also referred to as New Radio (NR), have been envisaged to use multiple input-multiple output (MIMO) multi-antenna transmission techniques. Constantly increasing requirements for high throughput motivates the wireless communication systems, such as 5G, to use the mmWave (millimeter wave) frequencies due to available high bandwidth.

However, the usage of mmWave frequencies poses new challenges on MIMO performance.

The signal received by an antenna is the sum of several replicas of the transmitted signal, each being characterized by its own attenuation and delay. Transmitted signals are typically reflected and scattered, arriving at the receiver through multiple paths. When the relative path delays are on the order of a symbol period or more, images of different symbols arrive at the same time, causing Intersymbol Interference (ISI). A Power Delay Profile (PDP) gives the intensity of a received signal through a multipath channel as a function of delay spread.

The estimation of PDP is necessary to perform the channel estimation in a best possible manner. The proper channel estimation is important for improvement of demodulation performances in both the base station side and the mobile terminal side.

PDP estimation mechanisms have commonly been based on IFFT (Inverse Fast Fourier Transform) calculations and correlations which require high CPU (Central Processing Unit) costs due to complexity. In that case, channel impulse response (CIR) in time domain is derived from the CIR in the frequency domain using the IFFT, and then, instantaneous PDP parameters are estimated by successive correlations. Main additional drawbacks of this technique are the poor performances for low SNRs (signal to noise ratio) and for small bandwidth allocation.

SUMMARY

The present invention introduces a new efficient mechanism for estimating a Power Delay Profile (PDP) based on LMMSE (Linear Minimum Mean Square Error) or MMSE (Minimum Mean Square Error) properties exploiting the knowledge of channel statistics. This only results in the calculation of the variance of the derivative of raw channel estimates in frequency domain, thus minimizing the CPU costs. This and other detailed advantages are also listed in the end of the detailed description.

Power Delay Profile estimation is necessary for channel estimation and then for demodulation. The PDP is estimated directly in the frequency domain using knowledge of channel statistic properties. An approximation is used by estimating the second order statistics of the channel autocorrelation function in time domain represented by the variance of the derivative of raw channel estimates in frequency domain. The use of IFFT is thus avoided when this estimate is made in the time domain or of numerous successive correlations when this one is made in the frequency domain.

The present invention is a non-costly method, and it presents a non-parametric estimation, where the above second order statistics may be estimated without requiring any assumption on the PDP model. The introduced method according to the invention is also efficient in term of performances.

The presented method may be introduced both on the gNB (i.e. the base station) side and on the mobile terminal side since the two entities must estimate the channel to demodulate the information.

Now, an improved method and technical equipment implementing the method have been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding figures and in the detailed description.

The scope of protection sought for various embodiments of the present invention is set out by the independent claims. The embodiments and features, if any, described in this specification that do not fall under the scope of the independent claims are to be interpreted as examples useful for understanding various embodiments of the present invention.

According to a first aspect of the present invention, there is introduced an apparatus comprising:
- a multiple input-multiple output (MIMO) antenna;
- means for receiving a demodulation reference signal (DMRS) vector in frequency domain (21);
- means for estimating raw channel estimates vector (23) from the received DMRS vector in frequency domain (21);
- means for calculating a derivative vector (25) of the raw channel estimates vector (23);
- means for determining a second order statistics estimation (28), by calculating variance of the derivative vector (25) of the raw channel estimates vector (23) and by calculating variance of noise estimation (26), and by subtracting the calculated variance of noise estimation (26) from the calculated variance of the derivative vector (25) of the raw channel estimates vector (23);
- means for estimating a root mean square (RMS) delay spread (29) for each radio path, from the determined second order statistics estimation (28); and
- means for estimating a Power Delay Profile (PDP) by comparison between the estimated RMS delay spread and predetermined RMS delay spread thresholds.

According to an embodiment of the first aspect of the present invention, the apparatus comprises
- means for calculating the variance of noise estimation (26) by subtraction of a reconstituted signal with a received signal.

According to an embodiment of the first aspect of the present invention, the means for estimating an RMS delay spread (29) for each radio path is configured to estimate the RMS delay spread (29) by $$\text{rms\_ds} \cong \frac{\sqrt{v}}{2\pi\Delta F},$$

where V is the determined second order statistics estimation (28), and ΔF is the single carrier spacing in Hz.

According to an embodiment of the first aspect of the present invention, the apparatus comprises
means for calculating the raw channel estimates vector (23) for each TX/RX radio path k and on each DMRS position of an allocated Physical Resource Block (PRB) according to the following formula:

$H\_RAW\_DMRS_{k,i} = r_{k,i} s_{k,i}^*$ for $i=0$:nDMRS−1 and $k=0$:nTX*nRX−1 where nDMRS is the number of DMRS in all allocated PRB, and where $r_{k,i}$ is the received sample DMRS in (k,i) position and $s_{k,i}^*$ is the conjugate of known DMRS symbol in (k,i) position.

According to an embodiment of the first aspect of the present invention,
in case of more than one transmission antenna and one reception antenna yielding k>1, H_RAW_DMRS [i] of each radio path k are concatenated yielding nDMRS=nDMRS*k, thus obtaining the raw channel estimates vector (23).

According to an embodiment of the first aspect of the present invention, the apparatus comprises
means for calculating the derivative vector (25) of the raw channel estimates vector (23) by making the difference between two DMRS:s over the resulting distance, DMRS after DMRS.

According to an embodiment of the first aspect of the present invention, the apparatus comprises
means for calculating the derivative vector (25) of the raw channel estimates vector (23) for each radio path k by:

$\alpha[i] = (H\_RAW\_DMRS[M+i] - H\_RAW\_DMRS[i])/N$ for $i=0$:nMeas−1 wherein N is the number of resource elements between two DMRS:s dedicated for measurements, and wherein M=N/2=the distance between two DMRS:s dedicated for the measurement of the frequency drift, and wherein nMeas is the number of measurements=nDMRS−M, which is also the length of the derivative vector (25) of the raw channel estimates vector (23) on each radio path k.

According to an embodiment of the first aspect of the present invention, the apparatus comprises
the means for determining the second order statistics estimation (28), where the second order statistics estimation (28) corresponds to the variance of the derivative vector (25) of the raw channel estimates vector (23) by:

$$V = \frac{1}{nMeas} \sum_{i=0}^{i=nMeas-1} |\alpha_i - \bar{\alpha}|^2 - \widehat{n\sigma}$$

wherein V is the determined second order statistics estimation (28), and [α] is the derivative vector (25) resulting from the derivative operator (24), and $\bar{\alpha}$ is the mean value, and $\widehat{n\sigma}$ is the variance of noise estimation (26).

According to an embodiment of the first aspect of the present invention, the apparatus comprises
means for performing Minimum Mean Square Error (MMSE) or Linear Minimum Mean Square Error (LMMSE) based channel estimation based on the estimated Power Delay Profile (PDP).

According to an embodiment of the first aspect of the present invention, the apparatus is a base station, which base station comprises means for estimating the channel to demodulate information.

According to an embodiment of the first aspect of the present invention, the apparatus is a mobile terminal, which mobile terminal comprises means for estimating the channel to demodulate information.

The means as referred to herein and in related embodiments may comprise at least one processor; and at least one memory including computer program code, the at least one memory and computer program code configured to, with the at least one processor, cause the performance of the apparatus.

According to a second aspect of the present invention, there is provided an apparatus comprising:
at least one processor; and
at least one memory
storing instructions that, when executed by the at least one processor, cause the apparatus at least to:
transmit and/or receive wireless signals via a multiple input-multiple output (MIMO) antenna;
receive a demodulation reference signal (DMRS) vector in frequency domain (21);
estimate raw channel estimates vector (23) from the received DMRS vector in frequency domain (21);
calculate a derivative vector (25) of the raw channel estimates vector (23);
determine a second order statistics estimation (28), by calculating variance of the derivative vector (25) of the raw channel estimates vector (23) and by calculating variance of noise estimation (26), and by subtracting the calculated variance of noise estimation (26) from the calculated variance of the derivative vector (25) of the raw channel estimates vector (23);
estimate a root mean square (RMS) delay spread (29) for each radio path, from the determined second order statistics estimation (28); and
estimate a Power Delay Profile (PDP) by comparison between the estimated RMS delay spread and predetermined RMS delay spread thresholds.

According to an embodiment of the second aspect of the present invention, the apparatus is further caused to:
calculate the variance of noise estimation (26) by subtraction of a reconstituted signal with a received signal.

According to an embodiment of the second aspect of the present invention, the estimating an RMS delay spread (29) for each radio path is configured to estimate the RMS delay spread (29) by $$\text{rms\_ds} \cong \frac{\sqrt{v}}{2\pi\Delta F},$$

where V is the determined second order statistics estimation (28), and ΔF is the single carrier spacing in Hz.

According to an embodiment of the second aspect of the present invention, the apparatus is further caused to:

calculate the raw channel estimates vector (23) for each TX/RX radio path k and on each DMRS position of an allocated Physical Resource Block (PRB) according to the following formula:

$$H\_RAW\_DMRS_{k,i} = r_{k,i} s_{k,i}^* \text{ for } i=0:\text{nDMRS}-1 \text{ and } k=0:nTX*nRX-1$$

where nDMRS is the number of DMRS in all allocated PRB, and where $r_{k,i}$ is the received sample DMRS in (k,i) position and $s_{k,i}^*$ is the conjugate of known DMRS symbol in (k,i) position.

According to an embodiment of the second aspect of the present invention, in case of more than one transmission antenna and one reception antenna yielding k>1, H_RAW_DMRS [i] of each radio path k are concatenated yielding nDMRS=nDMRS*k, thus obtaining the raw channel estimates vector (23).

According to an embodiment of the second aspect of the present invention, the apparatus is further caused to:

calculate the derivative vector (25) of the raw channel estimates vector (23) by making the difference between two DMRS:s over the resulting distance, DMRS after DMRS.

According to an embodiment of the second aspect of the present invention, the apparatus is further caused to:

calculate the derivative vector (25) of the raw channel estimates vector (23) for each radio path k by:

$$\alpha[i] = (H\_RAW\_DMRS[M+i] - H\_RAW\_DMRS[i])/N \text{ for } i=0:\text{nMeas}-1$$

wherein N is the number of resource elements between two DMRS:s dedicated for measurements, and wherein M=N/2=the distance between two DMRS:s dedicated for the measurement of the frequency drift, and wherein nMeas is the number of measurements=nDMRS−M, which is also the length of the derivative vector (25) of the raw channel estimates vector (23) on each radio path k.

According to an embodiment of the second aspect of the present invention, the apparatus is further caused to:

determine the second order statistics estimation (28), where the second order statistics estimation (28) corresponds to the variance of the derivative vector (25) of the raw channel estimates vector (23) by:

$$V = \frac{1}{nMeas} \sum_{i=0}^{i=nMeas-1} |\alpha_i - \bar{\alpha}|^2 - \widetilde{no}$$

wherein V is the determined second order statistics estimation (28), and [α] is the derivative vector (25) resulting from the derivative operator (24), and $\bar{\alpha}$ is the mean value, and $\widetilde{no}$ is the variance of noise estimation (26).

According to an embodiment of the second aspect of the present invention, the apparatus is further caused to:

perform Minimum Mean Square Error (MMSE) or Linear Minimum Mean Square Error (LMMSE) based channel estimation based on the estimated Power Delay Profile (PDP).

According to an embodiment of the second aspect of the present invention, the apparatus is a base station, which base station is further caused to estimate the channel to demodulate information.

According to an embodiment of the second aspect of the present invention, the apparatus is a mobile terminal, which mobile terminal is further caused to estimate the channel to demodulate information.

According to a third aspect of the present invention, there is provided a method, comprising the steps of:

transmitting and/or receiving wireless signals via a multiple input-multiple output (MIMO) antenna;

receiving a demodulation reference signal (DMRS) vector in frequency domain (21);

estimating raw channel estimates vector (23) from the received DMRS vector in frequency domain (21);

calculating a derivative vector (25) of the raw channel estimates vector (23);

determining a second order statistics estimation (28), by calculating variance of the derivative vector (25) of the raw channel estimates vector (23) and by calculating variance of noise estimation (26), and by subtracting the calculated variance of noise estimation (26) from the calculated variance of the derivative vector (25) of the raw channel estimates vector (23);

estimating a root mean square (RMS) delay spread (29) for each radio path, from the determined second order statistics estimation (28); and estimating a Power Delay Profile (PDP) by comparison between the estimated RMS delay spread and predetermined RMS delay spread thresholds.

In various embodiments of the present invention according to the third aspect, the method may comprise the respective steps as disclosed already in various embodiments of the first and the second aspects of the present invention in the above.

Furthermore, there is provided an apparatus according to a further aspect comprises at least one processor and at least one memory, said at least one memory stored with computer program code thereon, the at least one memory and the computer program code configured to, with the at least one processor, cause the apparatus at least to perform the above method steps in connection with the third aspect of the present invention.

According to a fourth aspect of the present invention, there is provided a computer program comprising instructions stored thereon for performing at least the following:

transmitting and/or receiving wireless signals via a multiple input-multiple output (MIMO) antenna;

receiving a demodulation reference signal (DMRS) vector in frequency domain (21);

estimating raw channel estimates vector (23) from the received DMRS vector in frequency domain (21);

calculating a derivative vector (25) of the raw channel estimates vector (23);

determining a second order statistics estimation (28), by calculating variance of the derivative vector (25) of the raw channel estimates vector (23) and by calculating variance of noise estimation (26), and by subtracting the calculated variance of noise estimation (26) from the calculated variance of the derivative vector (25) of the raw channel estimates vector (23);

estimating a root mean square (RMS) delay spread (29) for each radio path, from the determined second order statistics estimation (28); and estimating a Power Delay Profile (PDP) by comparison between the estimated RMS delay spread and predetermined RMS delay spread thresholds.

In various embodiments of the present invention according to the fourth aspect, the computer program may comprise the respective steps (=comprise instructions stored thereon for performing) as disclosed already in various embodiments of the first, the second and the third aspects of the present invention in the above.

According to a fifth aspect of the present invention, there is provided a non-transitory computer readable medium comprising program instructions stored thereon for performing at least the following:
- transmitting and/or receiving wireless signals via a multiple input-multiple output (MIMO) antenna;
- receiving a demodulation reference signal (DMRS) vector in frequency domain (21);
- estimating raw channel estimates vector (23) from the received DMRS vector in frequency domain (21);
- calculating a derivative vector (25) of the raw channel estimates vector (23);
- determining a second order statistics estimation (28), by calculating variance of the derivative vector (25) of the raw channel estimates vector (23) and by calculating variance of noise estimation (26), and by subtracting the calculated variance of noise estimation (26) from the calculated variance of the derivative vector (25) of the raw channel estimates vector (23);
- estimating a root mean square (RMS) delay spread (29) for each radio path, from the determined second order statistics estimation (28); and
- estimating a Power Delay Profile (PDP) by comparison between the estimated RMS delay spread and predetermined RMS delay spread thresholds.

In various embodiments of the present invention according to the fifth aspect, the computer readable medium may comprise the respective steps (=comprise program instructions stored thereon for performing) as disclosed already in various embodiments of the first, the second, the third and the fourth aspects of the present invention in the above.

In a further option, computer readable storage media (i.e. computer readable medium) according to further aspects of the present invention comprise code for use by an apparatus, which when executed by a processor, causes the apparatus to perform the various embodiments of the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION

Figure 1:
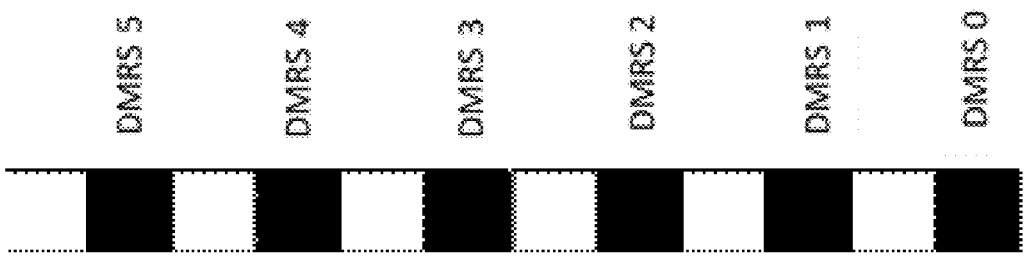
FIG. 1 illustrates an embodiment of the invention, showing six Demodulation Reference Signals (DMRS) in a single Physical Resource Block (PRB)

The following describes in further detail suitable apparatus and possible mechanisms carrying out the Power Delay Profile (PDP) estimation, which is further usable in channel estimation purposes for the base station or for the mobile station(s), or even for both of those elements, in various embodiments of the invention. While the following focuses on 5G networks, the embodiments as described further below are by no means limited to be implemented in said networks only, but they are applicable in any network implementing MU-MIMO transmissions.

The theoretical aspect of the present invention is discussed first.

The signal received by an antenna is the sum of several replicas of the transmitted signal, each being characterized by its own attenuation and delay. By large number effect (central limit theorem) the received signal can be considered as centered Gaussian.

Power Delay Profile gives the intensity of a received signal through a multipath channel as a function of delay spread.

Delay spread introduces variations in frequency domain that can be viewed by a linear frequency drift which is superimposed on a reference signal regarding the development of "Karhunen-Loeve" for decomposition of a spectral operator which makes it possible to represent fading as a superposition of uncorrelated Gaussian random variables being therefore independent.

The effect of non-stationarity in frequency domain can be represented by an additive complex noise which drifts from one end to the other of a selected sequence length close to its coherence bandwidth.

The fading process being Gaussian, its derivative being a linear transformation is Gaussian too. It can therefore be uniquely characterized by its variance.

It is shown that processes defining fading are independent and the variance of the derivative in frequency domain into an interval close of its coherence bandwidth is proportional to the delay spread.

An optimal channel estimation technique that minimizes the MSE (mean square error) is the well-known linear minimum mean square error (LMMSE). LMMSE is based on the knowledge of channel statistics. These channel statistics are represented by the Power Delay Profile (PDP).

It is to be emphasized that the presented procedure is independent of the type of channel sounding; thus, the applied channel estimation technique may be LMMSE or MMSE; both work in a similar way in this context.

Due to the complexity of estimating the complete PDP, an approximation by evaluating statistics estimations yielding RMS delay spread is typically used. Mathematical demonstration shows that the variance of the derivative of raw channel estimates in frequency domain, corresponds to the second derivative at the origin of the autocorrelation function of raw channel estimates in time domain, and this result is useful for computing the RMS delay spread in time domain. Those statistics with the help of an assumed PDP model allow performing accurate channel estimation.

The models currently used for the PDP are the uniform model and the exponential decaying model.

Note that when assuming an exponential PDP distribution, mean delay spread and RMS delay spread are equal to the decay factor.

Main drawback of the current PDP estimations and generally for all techniques done in the time domain is a high computational complexity due to the usage of Fourier Transform or inverse Fourier Transform (IFFT).

A new PDP estimation method based on channel statistics directly exploiting frequency domain received samples is introduced in the following embodiments describing the present invention.

Let $X(f)$ be the channel impulse response in the frequency domain and $X'(f)$ derivative of $X(f)$ with respect to frequency $f$.

The power delay profile $R_{XX}(u)$ is defined as the autocorrelation of channel response $X(f)$:

$$R_{XX}(u) \stackrel{def}{=} E(X(f)X(f-u)) \quad (1)$$

Deriving the above equation with respect to u yields:

$$\frac{\partial}{\partial u} R_{XX}(u) = E\left(X(f) \frac{\partial}{\partial u} X(f-u)\right) = -E(X(f)X'(f-u))$$

Under the assumption of the autocorrelation stationarity:

$$\frac{\partial}{\partial u} R_{XX}(u) = -E(X(f+u)X'(f)) \quad (2)$$

Taking the autocorrelation function at 0 in the expression (2) leads to:

$$\frac{\partial}{\partial u} R_{XX}(0) = E(X(f)X'(f)) \quad (3)$$

Deriving again equation (2) one gets the second derivative of the autocorrelation function:

$$\frac{\partial^2}{\partial u^2} R_{XX}(u) = -E\left(\frac{\partial}{\partial u} X(f+u)X'(f)\right) = -E(X'(f+u)X'(f)) \quad (4)$$

$$\frac{\partial^2}{\partial u^2} R_{XX}(0) = -E(X'(f)^2)$$

Looking at the mathematical expressions (3) & (4), the most important observation, and fundamental property for estimation proposal is that from sampled frequency channel it is possible to get the first and second derivative at origin without any explicit calculation of the autocorrelation function.

It is shown in the following that the knowledge of the two derivatives values at origin are linked to the first and second order statistics of PDP in the time domain.

From Fourier transform identities it is possible to relate the function moments to the derivatives of the Fourier transform.

Let $h(t)$ be the time domain power delay profile, and $H(f)$ its Fourier transform.

The general Fourier transform identity is used:
Fourier transform of $t^n h(t)$ is the function $$\left(\frac{i}{2\pi}\right)^n H^{(n)}(f).$$

$H^{(n)}(f)$ being the n:th order derivative of H.

It follows that for f=0 and n=1:

$$\int t h(t) dt = \left(\frac{i}{2\pi}\right) H'(0) \quad (5)$$

Equation (5) expresses the mean delay as a function of first derivative at origin of Fourier transform of the time domain autocorrelation.

Similarly, for f=0 and n=2 the following is obtained:

$$\int t^2 h(t) dt = \left(\frac{i}{2\pi}\right)^2 H''(0) = -\frac{1}{4\pi^2} H''(0) \quad (6)$$

Now, equations (3) & (5) lead to the PDP being first order statistics estimation, and equations (4) & (6) lead to the PDP being second order statistics estimation.

$$D = \text{Mean Delay} = \left(\frac{i}{2\pi}\right) E(XX') \quad (7)$$

$$V = \text{Variance Delay} = \left(\frac{i}{2\pi}\right) E(X'^2) \quad (8)$$

The RMS delay spread follows from equations (7) & (8):

$$\text{RMS delay spread} = \sqrt{V - D^2} \quad (9)$$

It can be concluded at this stage that the calculation of the RMS delay spread applies second order statistics estimation, and the second order statistics estimation will also be discussed later in the practical aspect of the present invention and also in the description relating to FIG. 2.

A fundamental property is noted that the first order statistics and the second order statistics could be estimated without any assumption on the PDP model. Thus, the proposed estimation method is a non-parametric estimation method, giving robustness against PDP models variation depending on site location: indoor/outdoor etc.

The first order statistics estimation of the channel autocorrelation function corresponds to the average delay.

The second order statistics estimation of the channel autocorrelation function corresponds to the variance of the delays.

To have good robustness, it would be necessary to estimate additionally the average delay as shown in equation (9) above. Nevertheless, $D^2$ should be lower than V to make this calculation possible and this value ($D^2$) is always very low. Therefore, the RMS delay spread is taken directly without $D^2$ in the simulations below.

Steps for RMS delay spread estimation implementation are discussed next, in an embodiment.

Raw Channel coefficient estimation based on OFDM reference symbols $Z_k$ for k=1, ..., N on one antenna.

Filtering Raw channel estimates assuming maximum delay spread to reduce noise on $Z \rightarrow X_k$ for k=1, ..., N.

Derivative calculation proceeds as follows.

D, V and RMS delay spread calculations are based on equations (7), (8) and (9) using samples $X_k$ and $X'_k$.

One can calculate when valid different derivatives:

$$D_k^{(p)} = \frac{D_k - D_{k-p}}{p} \quad (10)$$

Validity of such an expression assumes that the channel coherence bandwidth is much higher than p times the pilot separation bandwidth.

Using an increased step p for derivative calculation allows a lower noise variance on the estimation.

Proof of this goes as follows. X is a noisy estimation of real channel R frequency response. $X_k = R_k + W_k$ where R are the exact channel coefficients and W are post-filtering noise samples with assumed variance $E(|W|^2) = \sigma^2$.

Using statistical independence between R and W, it is obtained:

$$\hat{V}^{(p)} = E\left(D^{(p)^2}\right) = E\left(|R_k - R_{k-p}|^2\right) + 2\frac{\sigma^2}{p^2} \quad (11)$$

Equation (11) shows that noise power on p step derivative $V^{(p)}, \sigma^{(p)^2}$ is 2 and therefore, the benefit of using an increased step can be seen.

$$2\frac{\sigma^2}{p^2}$$

One can estimate the delay spread based on multiple p derivatives and then the best linear estimate under uncorrelated measurement is a weighted linear combination of p step estimations. The weights are the reciprocal of noise variances of measurements normalized by their sum.

$$\hat{V} = \sum_{k=1}^{p} w_k V^{(k)} \quad w_k = \frac{k^2}{\sum_{j=1}^{p} \frac{1}{j^2}}$$

The practical aspect of the present invention is discussed next.

This is discussed according to an embodiment, with the following exemplary structural choices within the presented concept and with some exemplary parameter values.

In the case of the OFDM 5G radio system where the Single Carrier Spacing is ΔF=30 kHz, there are six DMRS of type 1 for each allocated PRB by dedicated antenna port yielding parameter N_DMRS_PER_PRB equal to 6. Raw channel estimation is computed on DMRS for each antenna port. FIG. 1 shows their implementation in one PRB, in the described embodiment.

The raw channel estimate vector is calculated for each TX/RX channel propagation path k (i.e. TX/RX radio path k) and on each DMRS position of the allocated PRB according to the following formula:

H_RAW_DMRS$_{k,i} = r_{k,i} s_{k,i}^*$ for $i=0$:nDMRS−1 and $k=0$:nTX*nRX−1

Let nDMRS be the number of DMRS in all allocated PRB. It results H_RAW_DMRS vector of length nDMRS where $r_{k,i}$ is the received sample DMRS in (k,i) position and $s_{k,i}^*$ is the conjugate of known DMRS symbol in (k,i) position.

The channel is therefore roughly estimated by this way. It is then possible to filter the raw channel estimates assuming maximum delay spread to reduce noise.

The objective is to estimate the selectivity of the channel to guide the estimate as faithfully as possible. The selectivity of the channel is a function of the RMS delay spread.

Herein, the RMS delay spread can be evaluated by computing the variance of the derivative of raw channel estimates in frequency domain (referring to eq. (9) above) in place of the second derivative at the origin of the autocorrelation function of raw channel estimates in time domain (see the above theoretical aspect). See also the detailed formulas later concerning calculations of "V" (i.e. the second order statistics estimation 28) and "rms_ds" (i.e. the RMS delay spread 29). In other words, and in order to clarify the terminology also between the theoretical aspect described above and the subsequent practical aspect, the variance of the derivative of raw channel estimates in frequency domain (leading to the second order statistics estimation 28, i.e. "V", as shown in FIG. 2 and its respective description) corresponds to the second derivative at the origin of the autocorrelation function of raw channel estimates in time domain.

In an embodiment, three kinds of PDP characterized by short, medium and long delay spreads are defined. Long delay spread of 300 ns of the 3GPP normalization is that for which certain components of the transmitted signal can arrive in the cyclic prefix which corresponds to 2.38 μs for the 30 kHz of SCS. Short delay spreads are for those under 50 ns and medium delay spreads are for those under 150 ns. Those three values of delay spread will serve as thresholds of detection.

The second order statistics estimation of each case of PDP is characteristic of a delay spread. It is possible to switch to one of the 3 possible PDPs according to 3 thresholds of delay spreads and an estimation of delay spread.

Figure 2:
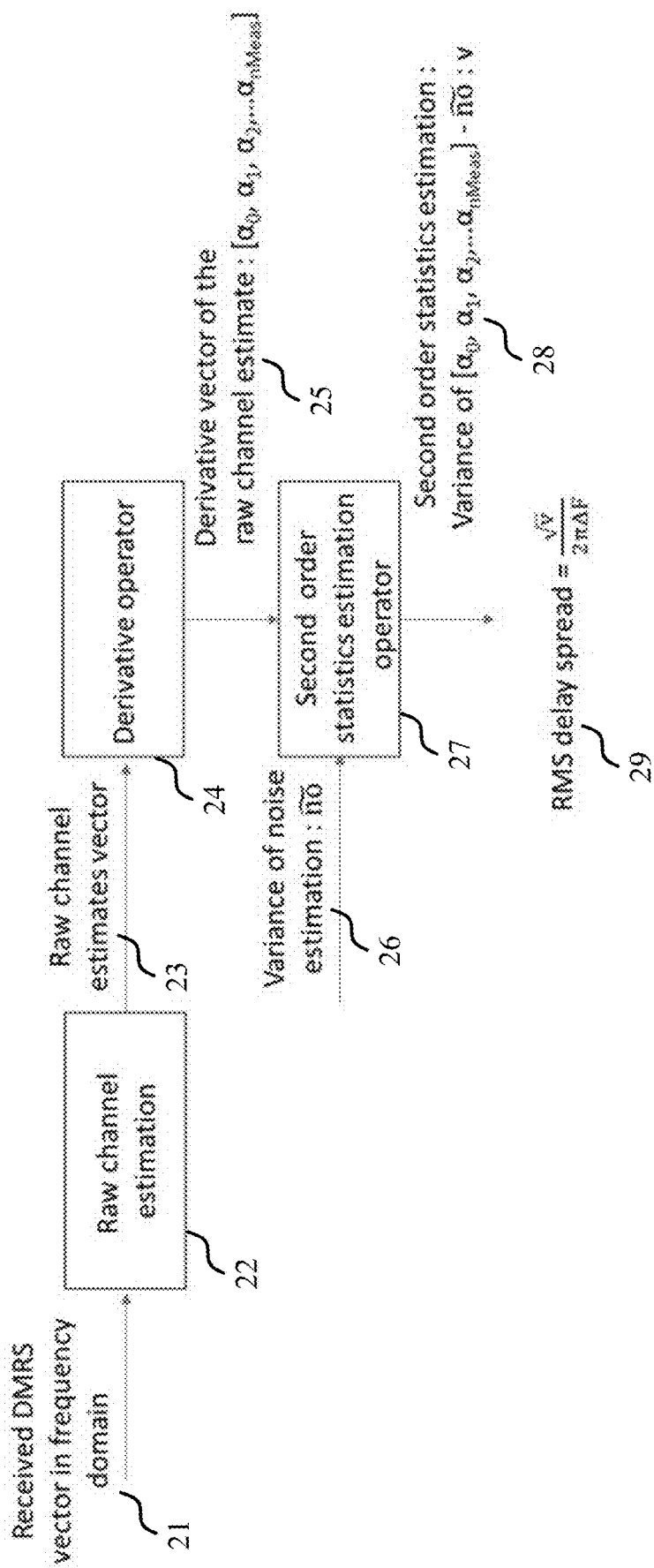
FIG. 2 illustrates the sequencing of features implementing the Root Mean Square (RMS) delay spread estimation method according to an embodiment of the present invention.

FIG. 2 shows the sequencing of features implementing the RMS delay spread estimation method, in an embodiment according to the present invention.

At first, from received DMRS vector in frequency domain 21, the raw channel estimates vector 23 is delivered according to the method described in the previous paragraph (by the raw channel estimation block 22).

In case of more than one transmission antenna and one reception antenna yielding k>1, H_RAW_DMRS [i] of each radio path k are concatenated yielding nDMRS=nDMRS*k.

Figure 3B:
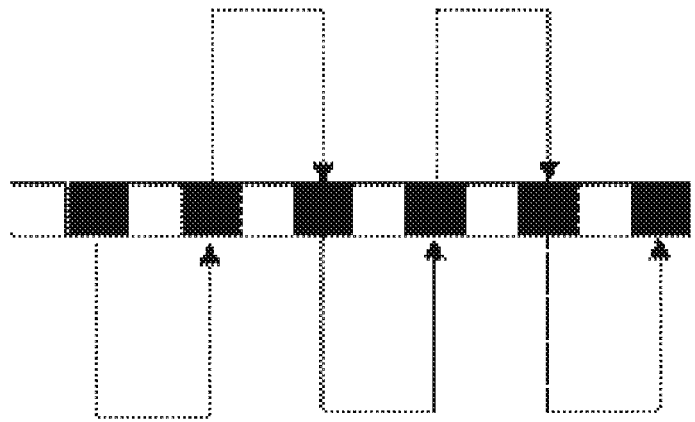
FIG. 3b illustrates a second example of processing in one allocated PRB, in an embodiment of the invention.
Figure 3A:
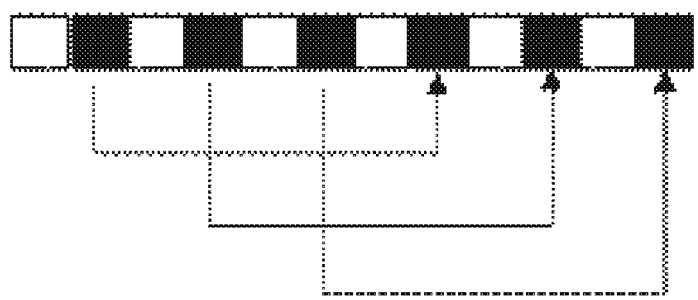
FIG. 3a illustrates a first example of processing in one allocated PRB, in an embodiment of the invention.

Secondly, a derivative vector 25 of the raw channel estimates vector 23 is then delivered, by the derivative operator 24. Derivative of raw channel estimates is calculated by making the difference between two DMRS over the resulting distance, DMRS after DMRS like it is shown in FIG. 3a and FIG. 3b, with each arrow representing a measurement. FIGS. 3a and 3b show two examples of processing in one allocated PRB. It is recalled that there are two resource elements between two DMRS of type 1 (delta_re=2). The derivative vector 25 of raw channel estimates vector depending on number of allocated PRBs is thus constructed. The procedure is generally built as follows, in an embodiment of the invention:

a. Let nDMRS be the number of received DMRS raw channel estimates.
 b. Let nPRB be the number of allocated PRB with nPRB=nDMRS/N_DMRS_PER_PRB.
 c. Let D_REF be the greatest distance in term of resource elements between two DMRS that is agreed for the measurements.

d. Let nPrbMetric be the number of PRBs in which the measurements are performed.
e. Let N be the number of resource elements between two DMRS dedicated for measurements. It is a multiple of D_REF. N=D_REF×nPrbMetric.
f. Let M be N/delta_re be the distance between two DMRS dedicated for the measurement of the frequency drift, where delta_re is the distance in terms of resource elements between two DMRS (2 resource elements for type 1).
g. The number of measurements is nMeas=nDMRS−M is also the length of the derivative vector 25 of raw channel estimates vector 23 on each radio path k. The derivative vector 25 of raw channel estimates vector for each radio path k is calculated in a general way:

$$\alpha[i]=(H\_RAW\_DMRS[M+i]-H\_RAW\_DMRS[i])/N$$
$$\text{for } i=0:\text{nMeas}-1$$

D_REF is set equal to 2 resource elements in order to follow the fluctuations of the channel as faithfully as possible in case of long delay spread. The parameter nPrbMetric is also set to 1, resulting N=2 and M=1. See also FIG. 3b.

Thirdly, a second order statistics estimation 28 is then delivered, by a respective operator 27. It incorporates the variance of the derivative vector 25 of raw channel estimates vector 23 according to the formula:

$$V = \frac{1}{nMeas} \sum_{i=0}^{i=nMeas-1} |\alpha_i - \overline{\alpha}|^2 - \widetilde{no}$$

[α] is the derivative vector 25 resulting from the derivative operator 24 and $\overline{\alpha}$ is the mean value and $\widetilde{no}$ is the variance of noise estimation 26 which can be estimated by any available method. V is the second order statistics estimation 28.

The variance of noise is previously computed by any method and then subtracted of the variance of the derivative vector of raw channel estimates, resulting in the second order statistics estimation (V) 28 according to the previous formula. Variance of noise may be estimated 26 by subtraction of the reconstituted signal with the received signal, in an embodiment of the invention.

Fourthly, in an embodiment, RMS delay spread 29 for each radio path k may be evaluated by:

$$\text{rms\_ds} \cong \frac{\sqrt{V}}{2\pi\Delta F},$$

where the proportionality factor is 2π, and V is the second order statistics estimation 28 from the above, rms_ds is the RMS delay spread 29, and ΔF is the Single Carrier Spacing (SCS).

Fifthly, PDP detection is made by comparison between the estimated RMS delay spread 29 and the RMS delay spread thresholds, in an embodiment of the invention.

In an embodiment of the present invention, the apparatus comprises means for determining the RMS delay spread thresholds as short, medium and long delay spreads, wherein the short delay spreads are under 50 ns, the medium delay spreads are between 50 ns-150 ns, and the long delay spreads are between 150 ns-300 ns.

An example of realization is presented next, with certain set of parameters applied in an embodiment of the present invention.

ΔF=30000 (Hz)
1t1 r transmission mode: 1 transmission antenna and 1 reception antenna
nDMRS=300
D_REF=6
nPrbMetric=2
N=D_REF×nPrbMetric=6×2=12
M=N/2=6
nPRB=nDMRS/N_DMRS_PER_PRB=300/6=50
nMeas=nDMRS−M=300−6=294
$\widetilde{no}$ is previously estimated
for i=0; i<nMeas; i++
    $\alpha_i=(H\_RAW\_DMRS_{i+M}-H\_RAW\_DMRS_i)/N$
end $$V = \frac{1}{nMeas} \sum_{i=0}^{i=nMeas-1} |\alpha_i - \overline{\alpha}|^2 - \widetilde{no}$$

$$\text{rms\_ds} \cong \frac{\sqrt{V}}{2\pi\Delta F}$$

Next, some results may be given based on the above given calculation principles, in certain embodiments of the present invention.

In the following, demodulation performances are discussed in certain embodiments of the present invention.

Figure 4A:
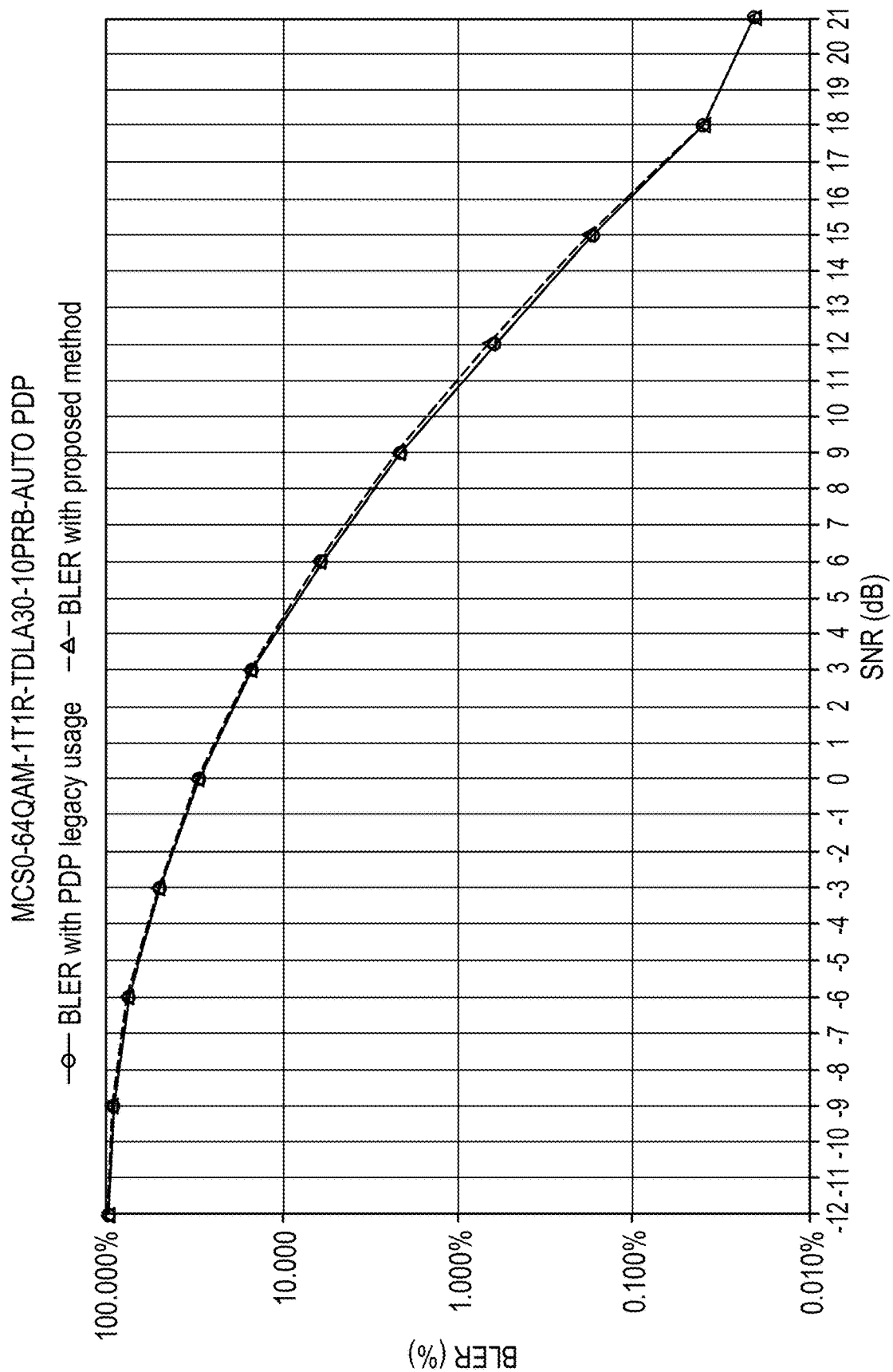
FIG. 4a illustrates demodulation performances compared between current PDP estimation method according to the prior art vs presented PDP estimation method according to an embodiment of the invention, with the performances being expressed in terms of Block Error Rate (BLER) for the coding scheme of MCS 0, and with a delay spread of 30 ns.

FIG. 4a illustrates demodulation performances compared between current PDP estimation method according to the prior art vs presented PDP estimation method according to an embodiment of the invention, with the performances being expressed in terms of Block Error Rate (BLER) for the coding scheme of MCS 0. In this example, a delay spread of 30 ns is used. Auto PDP setting is selected here. The continuous line is related to the current PDP estimator use and the dotted line is related to the proposed PDP estimation use according to the present invention.

It can be observed that the performance improvement is not that notable in this example.

Figure 4B:
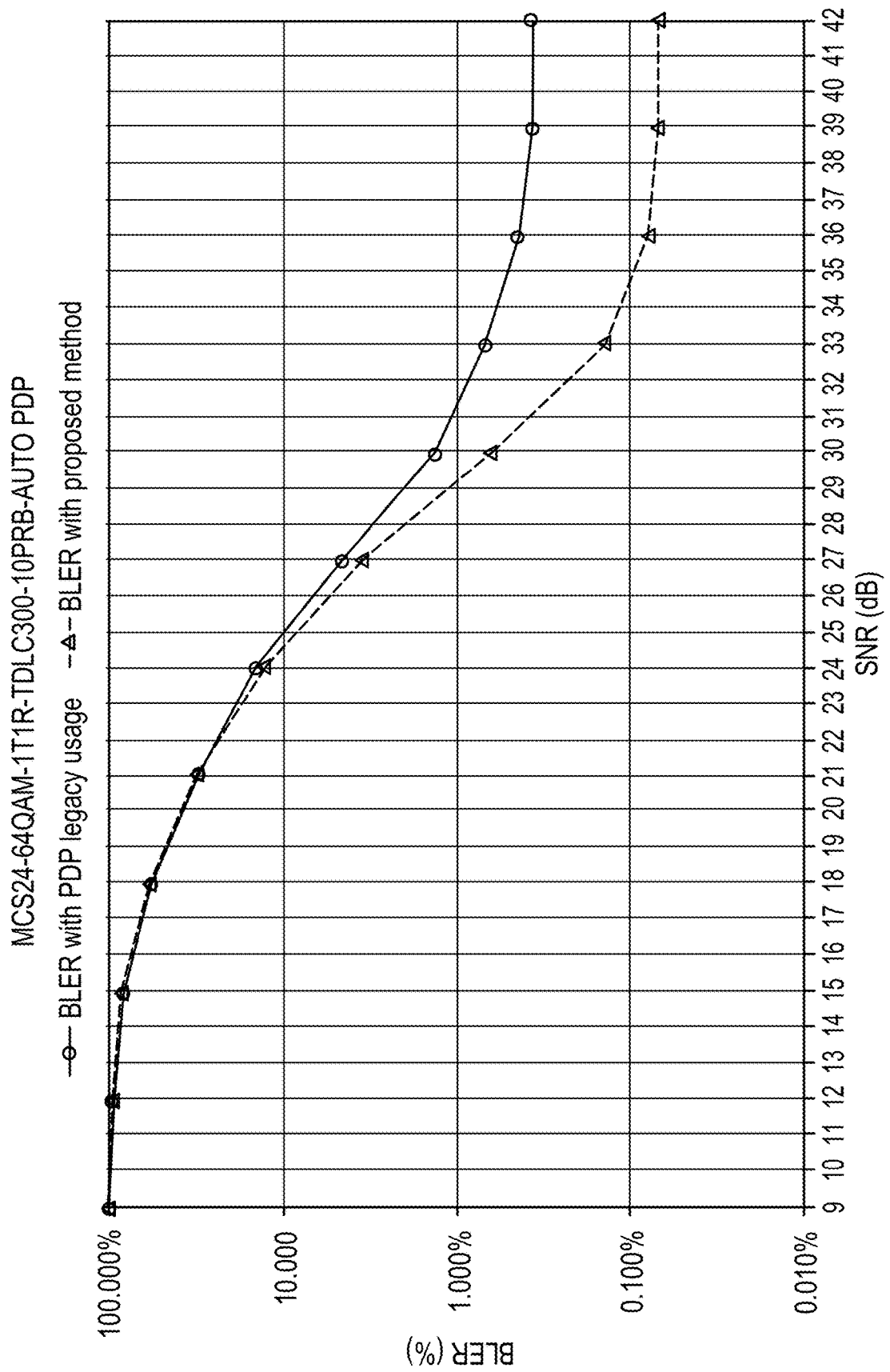
FIG. 4b illustrates demodulation performances compared between current PDP estimation method according to the prior art vs presented PDP estimation method according to an embodiment of the invention, with the performances being expressed in terms of Block Error Rate (BLER) for the coding scheme of MCS 24, and with a delay spread of 300 ns.

FIG. 4b illustrates demodulation performances compared between current PDP estimation method according to the prior art vs presented PDP estimation method according to an embodiment of the invention, with the performances being expressed in terms of Block Error Rate (BLER) for the coding scheme of MCS 24 in this case. Furthermore, a delay spread of 300 ns is used. Auto PDP setting is selected here. The continuous line is related to the current PDP estimator use and the dotted line is related to the proposed PDP estimation use according to the present invention.

It can be observed that the proposed PDP estimator according to the present invention performs much better than the current one (i.e. the prior art PDP estimator) implemented in the product for 300 ns case. The block error rate starts to be notable less than in prior art, when the SNR is appr. above 23-25 dB. The maximum performance increase can be seen along the whole range of the SNR being appr. between 36 dB and 42 dB.

The other advantage of the proposed method is the complexity reduction which will be detailed in the following.

Complexity comparisons are discussed next between the present invention and the earlier prior art methods.

With the present invention, IFFT process can be fully avoided, leading to simpler (i.e. fewer) calculations. This represents a notable advantage of the present invention.

Let's take an example of 25 PRB user bandwidth allocation resulting in 150 DMRS. The proposed method according to the present invention requires 300 multiplications for the calculation of the derivative and the variance while the currently implemented method in the prior art requires 2048 multiplications for the 256 points IFFT process and 4032 multiplications for the processing of the time-based auto-correlation calculus. The ratio 6080/300=20.26 i.e. ~20 times less operations with the new method according to the present invention. This result represents a notable improvement (i.e. simplification) in the complexity of the method.

It is also observed that the new method according to the present invention increases linearly with the PRB number while the current implemented method of the prior art has an increase of the order of n×log 2(n) for the IFFT process part. Thus, the ratio in complexity will increase with the bandwidth allocation increase of the factor log 2(n) approximately.

The presented technique avoids direct calculations of correlations and Fourier transform which are generally in use for known methods. The proposed method according to the invention has the following main advantages over classical prior art techniques.

At first, the method according to the present invention reduces complexity; with appr. 20 times less arithmetic operations for 25 PRB allocations.

Secondly, it offers similar performances for low delay spread cases but the gap in performances increases as the delay spread increases.

Thirdly, the present invention offers better performances for low bandwidth allocation.

As a conclusion, the present invention may be implemented with a very low CPU cost.

As a concluding summary concerning the technical effects and advantages of the present invention, the following is pointed out. The present invention describes suitable apparatus and possible mechanisms carrying out the Power Delay Profile (PDP) estimation, which is further usable in channel estimation purposes for the base station or for the mobile station(s), or even for both of those elements, in various embodiments of the invention. In other words, the present invention comprises (among others) the technical feature of:
- estimating a Power Delay Profile (PDP) by comparison between the estimated RMS delay spread and predetermined RMS delay spread thresholds; and respective means to perform this step.

There is presented a procedure which leads to the above step. When the PDP estimation has been made, there are several technical effects and advantages, which have been listed above; first and foremost the simpler processing is made possible, and as a result, good performance with very low number of CPU processing actions and lower respective costs. This has a further effect on the performance of demodulation when the channel information is accurately estimated, in an embodiment. As a result, the complete performance improves compared to the prior art solutions. A further advantage is that the presented procedure (and respective apparatus) is implementable in both the UE side and the base station side. This is because both these entities need to estimate the channel in order to demodulate information. There is thus a clear need for the presented procedure and respective apparatus.

In an embodiment, the present invention may be applied in 5G gNodeB:s, i.e. the respective base stations in 5G systems. In an embodiment, the present invention may be applied in 5G UEs, i.e. the respective mobile terminals. In other embodiments, it is possible to apply the described procedure (i.e. method) and the described device (i.e. apparatus) with some other generation of the telecommunication technologies, such as with 2G, 3G, 4G or 6G telecommunication systems, for instance.

The present invention may be implemented in various network elements and in various network configurations. For instance, the presented procedure may be applied in a base station of the applied network architecture. In an embodiment, the base station may be a BTS (a base station in 2G), a NodeB (a base station in 3G), an eNB (evolved NodeB; a base station in 4G), a gNB (Next Generation NodeB; a base station of the 5G system), a CU (a Centralized Unit part of the 5G gNB) or a DU (a Distributed Unit part of the 5G gNB), for instance. In an embodiment, the base station may be a 6G base station. In an embodiment, the presented procedure may be applied in a UE of the applied network architecture. In the following, there is discussion on a certain network scenario, and applied device elements within that network. It is meant to represent a certain embodiment on an environment where the PDP estimation method and the channel estimation method according to certain embodiments of the present invention may be implemented and realized.

Figure 5:
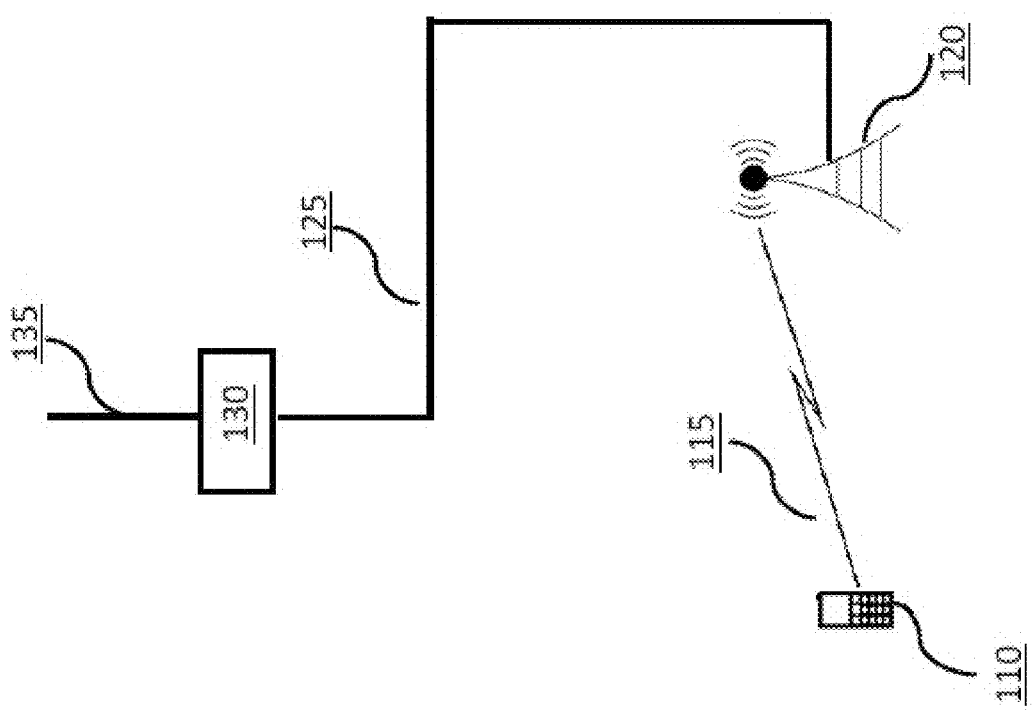
FIG. 5 illustrates an exemplary network scenario in accordance with at least some embodiments of the present invention.

FIG. 5 illustrates an exemplary radio network scenario in accordance with at least some embodiments of the present invention. According to the example scenario of FIG. 5, there may be a wireless communication network, which comprises User Equipment, UE 110, an access node, such as a Base Station, BS, 120, and core network element 130.

UE 110 may comprise, for example, a smartphone, a cellular phone, a Machine-to-Machine (M2M) node, Machine-Type Communications (MTC) node, an Internet of Things (IoT) node, a car, a car telemetry unit, a laptop computer, a tablet computer or another kind of suitable UE or mobile station. Generally, UE refers to any end device that may be capable of wireless communication. It can be either a mobile device or a stationary device. By way of example rather than limitation, a UE may also be referred to as a communication device, a terminal device, a Subscriber Station (SS), a Portable Subscriber Station, a Mobile Station (MS), or an Access Terminal (AT). In the example system of FIG. 5, UE 110 may communicate wirelessly with BS 120, or with a cell of BS 120, via air interface 115. In some example embodiments, BS 120 may be considered as a serving BS, for UE 110. UE 110 may also communicate simultaneously with more than one BS 120 and/or more than one cell of BS 120.

BS 120 may be connected, directly or via at least one intermediate node, with core network 130 via interface 125. Core network 130 may be, in turn, coupled via interface 135 with another network (not shown in FIG. 5), via whichever connectivity to further networks may be obtained, for example via a worldwide interconnection network. BS 120 may be connected with one or multiple other BS as well via an inter-base station interface (not shown in FIG. 5).

UE 110 may be connected to BS 120 via air interface 115. Air interface 115 between UE 110 and BS 120 may be configured in accordance with a Radio Access Technology, RAT, which UE 110 and BS 120 are configured to support. Examples of cellular RATs include Long Term Evolution (LTE), New Radio (NR), which may also be known as fifth generation (5G) radio access technology. For example, in the context of LTE, BS 120 may be referred to as an eNB while in the context of NR, BS 120 may be referred to as a gNB. In any case, example embodiments are not restricted to any particular radio technology. Instead, example embodiments may be exploited in any wireless communication network (which may be a cellular or a non-cellular technology) operating in accordance to 3GPP standard, IEEE standard (such as for example IEEE 802.11 based local area networks), or it can be some other radio technology, wherein it is desirable to achieve an improved transmission and/or reception performance between an access node such as a BS, and a UE, and in particular, an improved MIMO performance.

Ever increasing data throughput requirements in wireless communication networks requires usage of wide frequency spectrum. Thus, for example, frequency bands for 5G (also referred to as NR) are currently separated into different frequency ranges. Frequency Range 1 (FR1) includes sub-6 GHz frequency bands, some of which are frequency bands traditionally used by previous standards, but the range has been extended to cover potential new spectrum offerings up to 7125 MHz. Another range is Frequency Range 2 (FR2) that at the moment includes frequency bands from 24.25 GHz to 52.6 GHz. Frequencies of this range and above are referred to as mmWave frequencies. MmWave frequency ranges are attractive because of higher available bandwidth than frequency bands in the FR1, which helps to offer data rates that satisfy 5G demands.

The described embodiments can be particularly beneficial for mmWave frequencies, including FR2 ranges, but can be applied equally to FR1 or any other frequencies. As said earlier, although applicable to any wireless networks, the 5G is mainly focused in the discussed examples, for the sake of simplicity. 5G has been envisaged to use more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control.

MIMO is one of the key enabling techniques for 5G wireless technology. The underlying principle of MIMO is to use multiple transmit and receive antennas to increase throughput and/or reliability of data transmission. Increased throughput can be achieved by transmitting/receiving different data streams over multiple antennas, while increased reliability can be achieved by using multiple antennas for transmitting/receiving multiple versions of the same data.

Beamforming antenna arrays play an important role in 5G implementations. Although offering high bandwidth, mmWave frequencies have higher propagation losses that greatly vary depending on the environment. Smaller wavelength at higher carrier frequencies allows smaller antenna element sizes which gives an opportunity to place one or more (for example, two, three or more) relatively large antenna arrays at a UE. This in turn leads to various challenges to maintain the expected performance.

Considering as a non-limiting example 2×2 MIMO, downlink (DL) MIMO performance (for example, in mmWave frequency ranges, such as FR2) may be achieved by using polarization split (co-polar and cross-polar) of a dual feed antenna array at a base station (referred to also as a gNB) and/or at a UE, where each polarization corresponds to one MIMO branch. The reasoning behind this approach is to achieve high and similar antenna gain performance in both MIMO channels, while maintaining a compact spatial antenna design.

When designing dual-polarized antenna arrays, it is important to achieve high Cross Polarization Discrimination (XPD). XPD may be defined as a ratio of the co-polar component of the specified polarization and the orthogonal cross-polar component over a sector or beamwidth angle.

De-correlation at an antenna array may be obtained by ensuring that each antenna feed corresponds to a single polarization and that the resulting dual feed polarizations are designed to be orthogonal. This way, an antenna array with high XPD at the feed points may be designed. This approach will ensure full utilization of two MIMO channels for Line of Sight (LoS) and/or Non-Line of Sight (NLoS) operation provided that the maximum gain direction and the orientation of the orthogonal polarizations are aligned between antenna arrays at the UE and at the gNB.

In addition, high antenna gain requirements for mmWave (e.g. FR2) frequencies will reduce its radiation beam width, whereby beam steering at an antenna array (or arrays) is required to cover the needed angular space. The beam steering capabilities may be implemented using tunable phase shifters at each element in the antenna array, whereby the direction of the beam can be controlled electrically (phased array) instead of mechanical control.

The XPD of any antenna (or antenna array) depends on its radiation pattern and may change dynamically as a function of the Angle of Departure (AoD) and/or Angle of Arrival (AoA). This dependency increases as the variations in the radiation pattern change and as the radiation patterns change electrically. Higher antenna gain pattern leads to larger XPD variations over the angular space. Phase controlled arrays also have increased XPD variations over the angular space.

As such, the physical orientation of antennas at mmWave frequencies will affect MIMO throughput much more than what is seen at Sub-6 GHz frequencies, where the decorrelation at the UE is achieved by physical separation between two receiving antennas (each with random and different radiation pattern). Instead, the mmWave architecture may utilize dual orthogonally polarized antennas (or antenna arrays), designed for equal high gain radiation patterns.

Figure 6:
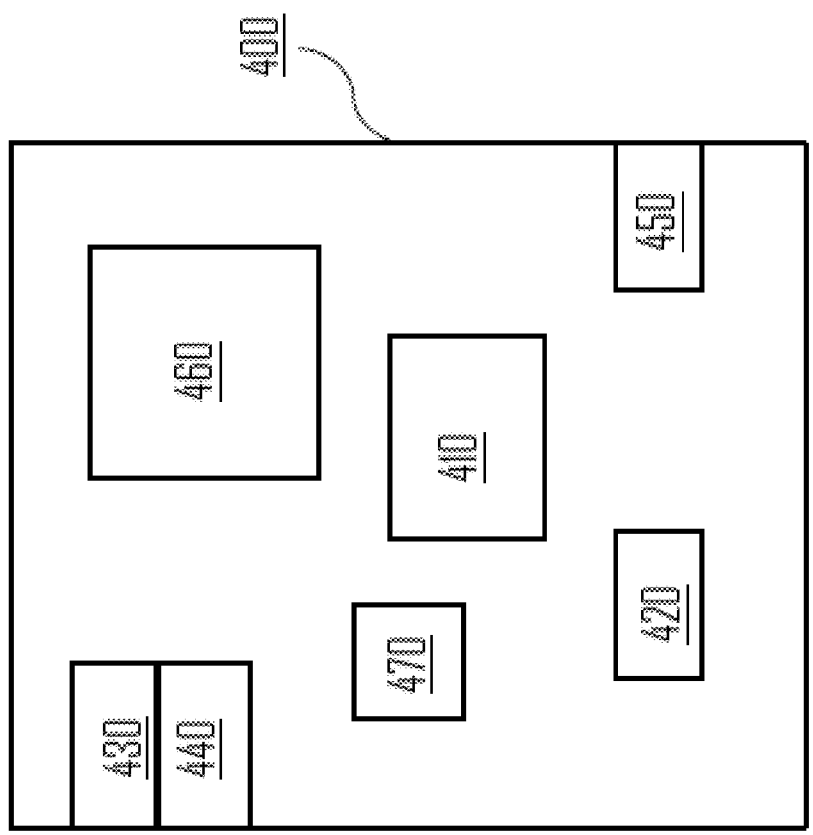
FIG. 6 illustrates an example apparatus capable of supporting at least some embodiments of the present invention.

FIG. 6 illustrates an example apparatus capable of supporting at least some embodiments of the present invention. There is illustrated an apparatus 400, which may be, or comprised in, for example, a UE 110. Comprised in apparatus 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one Application-Specific Integrated Circuit, ASIC. Processor 410 may comprise at least one Field-Programmable Gate Array, FPGA. Processor 410 may be means for performing method steps in device 400. Processor 410 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as UE 110 or BS 120, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM (random access memory) chip, and/or at least one ROM (read-only memory). Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with Global System for Mobile Communication, GSM, Wideband Code Division Multiple Access, WCDMA, 5G/NR, Long Term Evolution, LTE, IS-95, Wireless Local Area Network, WLAN, Ethernet and/or Worldwide Interoperability for Microwave Access, WiMAX, standards, for example.

Device 400 may comprise a Near-Field Communication, NFC, transceiver 450. NFC transceiver 450 may support at least one NFC technology, such as NFC, Bluetooth, Wibree or similar technologies.

Device 400 may comprise User Interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a Subscriber Identity Module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 6. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some embodiments, device 400 lacks at least one device described above. For example, some devices 400 may lack an NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the present invention.

According to an embodiment of the invention, UE 110 may monitor and/or evaluate its current MIMO quality. For example, UE 110 may monitor a certain parameter or a set of parameters related to MIMO quality (in a non-limited embodiment this can be MIMO rank, a parameter related to MIMO rank or used to obtain MIMO rank value which UE then reports to gNB, or any other suitable quality metric or metrics). For example, UE 110 may apply various algorithms to estimate the current MIMO rank, based on the measurements on reference signals (such as DMRS). In this context, invertibility of the MIMO channel matrix may be used, and different metrics may be considered, such as singular values, condition number, as well as any other metric that may qualify the invertibility of the MIMO channel matrix. Averages of various metrics, or any filtered values, could also be used, such as sliding window, finite impulse response filter, infinite impulse response filter or any order (e.g. first, second, . . . , n-th order) should also be considered. The Frequency average of channel estimates of the MIMO channel may be also taken into consideration, such as narrow band on single subcarrier DMRS or full-blown bandwidth allocated to UE, with different averaging techniques.

According to an embodiment of the invention, UE 110 may correlate MIMO transmission and/or reception quality with a Power Delay Profile (PDP) of an incoming signal. The PDP characterizes an intensity of a signal received through a multipath channel as a function of time delay, as described earlier. PDP thus may indicate multipath component(s) based on power peaks above threshold level over a delay interval.

In an embodiment, the UE 110 may determine if a possible better antenna configuration at the UE 110 could improve transmission and/or reception quality (such as MIMO rank or any other suitable quality metric as described above) and/or throughput, based on a parameter associated with the current MIMO quality and a PDP.

In an embodiment, the UE may use reference signals to scan for a new component carrier and/or Angular Power Group (i.e. APG). This could be channel state information reference signal (i.e. CSI-RS) (for example, with repetition set to "On"), synchronization signal block (SSB), position reference signal or some other existing or future suitable reference signal or signals. Also dedicated reference signals may be defined in the standard for these purposes. In an embodiment, the UE may then configure a single or multiple (two or more) antenna arrays for MIMO reception of multiple component carriers of different Angle of Arrival (AoA), where the chosen polarization configuration is optimized for optimal MIMO rank and/or combined power.

Thus, according to at least some embodiments, UE may determine if it is receiving a different signal component (e.g. a second component) by evaluating radio channel estimated PDP of the received signal. The PDP estimation can be performed for each polarization, wherein each polarization may correspond to a particular MIMO branch. The PDP estimation can be done with wide beams. The UE can thereby avoid blindly doing a time-consuming full beam scan on the whole antenna array if it is not needed.

According to an embodiment, the findings of the present invention are utilized in order to configure the antennas on the UE for better MIMO transmission and/or reception, for example in the case where the envisioned direct dual polarized MIMO configuration fails to achieve a sufficiently high MIMO rank in either LoS or NLoS environments.

In at least some embodiments, a UE 110 may receive one or more reference signal from a base station (BS), such as demodulation reference signal (DMRS), CSI-RS, or some other reference signal or signals. The UE 110 may further use one or more received reference signal for evaluating MIMO quality (in a non-limiting embodiment, this can be MIMO rank, a parameter related to or indicative of MIMO rank, or any other suitable quality metric or metrics). Alternatively, or in addition to using reference signals, the UE 110 may use some other method or combination of methods for evaluating MIMO quality.

In an embodiment, UE 110 may calculate its current MIMO quality (such as rank, a parameter indicating the rank, or any other suitable quality metric as described above) with current antenna configuration. Next, the UE 110 may determine whether the current MIMO quality is sufficient. For example, in an embodiment, UE 110 may compare its current MIMO quality with a pre-determined threshold. In an embodiment, the threshold can be for example UE-driven. In some other embodiments, the threshold can be controlled by the network. Embodiments of the present invention may be applied to various MIMO configurations, such as 2×2 MIMO, 4×4 MIMO, or any other MIMO configuration.

If MIMO quality is above the threshold, in an embodiment this may indicate that current MIMO quality (e.g. rank) is sufficient. The UE 110 may in this case keep the current antenna configuration unchanged. The UE 110 may further wait for the next scheduled reference signal (for example, DMRS, CSI-RS or some other reference signal). Comparing to a threshold can also be implemented in a form of evaluating TRUE/FALSE condition.

In an exemplary embodiment, an apparatus, such as, for example, UE 110 or BS 120, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process (i.e. a method) comprising the embodiments described above and any combination thereof.

In an exemplary embodiment, an apparatus, such as, for example, UE 110 or BS 120, may comprise at least one processor, and at least one memory including computer program code, wherein the at least one memory and the computer program code are configured to, with the at least one processor, cause the apparatus at least to perform the embodiments described above and any combination thereof.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

In an embodiment of the present invention, there is introduced a base station comprising:
- a multiple input-multiple output (MIMO) antenna;
- means for receiving a demodulation reference signal (DMRS) vector in frequency domain (21);
- means for estimating raw channel estimates vector (23) from the received DMRS vector in frequency domain (21);

means for calculating a derivative vector (25) of the raw channel estimates vector (23);

means for determining a second order statistics estimation (28), by calculating variance of the derivative vector (25) of the raw channel estimates vector (23) and by calculating variance of noise estimation (26), and by subtracting the calculated variance of noise estimation (26) from the calculated variance of the derivative vector (25) of the raw channel estimates vector (23);

means for estimating a root mean square (RMS) delay spread (29) for each radio path, from the determined second order statistics estimation (28); and means for estimating a Power Delay Profile (PDP) by comparison between the estimated RMS delay spread and predetermined RMS delay spread thresholds.

In an embodiment of the base station, the base station comprises:

means for calculating the variance of noise estimation (26) by subtraction of a reconstituted signal with a received signal.

In an embodiment of the base station, the means for estimating an RMS delay spread (29) for each radio path is configured to estimate the RMS delay spread (29) by $$\text{rms\_ds} \cong \frac{\sqrt{v}}{2\pi\Delta F},$$

where V is the determined second order statistics estimation (28), and ΔF is the single carrier spacing in Hz.

In an embodiment of the base station, the base station comprises:

means for calculating the raw channel estimates vector (23) for each TX/RX radio path k and on each DMRS position of an allocated Physical Resource Block (PRB) according to the following formula:

H_RAW_DMRS$_{k,i}$=r$_{k,i}$s$_{k,i}$* for $i$=0:nDMRS−1 and $k$=0:nTX*nRX−1 where nDMRS is the number of DMRS in all allocated PRB, and where r$_{k,i}$ is the received sample DMRS in (k,i) position and s$_{k,i}$* is the conjugate of known DMRS symbol in (k,i) position.

In an embodiment of the base station, in case of more than one transmission antenna and one reception antenna yielding k>1, H_RAW_DMRS [i] of each radio path k are concatenated yielding nDMRS=nDMRS*k, thus obtaining the raw channel estimates vector (23).

In an embodiment of the base station, the base station comprises:

means for calculating the derivative vector (25) of the raw channel estimates vector (23) by making the difference between two DMRS:s over the resulting distance, DMRS after DMRS.

In an embodiment of the base station, the base station comprises:

means for calculating the derivative vector (25) of the raw channel estimates vector (23) for each radio path k by:

α[$i$]=(H_RAW_DMRS[M+$i$]−H_RAW_DMRS[$i$])/N for $i$=0:nMeas−1 wherein N is the number of resource elements between two DMRS:s dedicated for measurements, and wherein M=N/2=the distance between two DMRS:s dedicated for the measurement of the frequency drift, and wherein nMeas is the number of measurements=nDMRS−M, which is also the length of the derivative vector (25) of the raw channel estimates vector (23) on each radio path k.

In an embodiment of the base station, the base station comprises:

the means for determining the second order statistics estimation (28), where the second order statistics estimation (28) corresponds to the variance of the derivative vector (25) of the raw channel estimates vector (23) by:

$$V = \frac{1}{nMeas} \sum_{i=0}^{i=nMeas-1} |\alpha_i - \overline{\alpha}|^2 - \widetilde{no}$$

wherein V is the determined second order statistics estimation (28), and [α] is the derivative vector (25) resulting from the derivative operator (24), and $\overline{\alpha}$ is the mean value, and $\widetilde{no}$ is the variance of noise estimation (26).

In an embodiment of the base station, the base station comprises:

means for performing Minimum Mean Square Error (MMSE) or Linear Minimum Mean Square Error (LMMSE) based channel estimation based on the estimated Power Delay Profile (PDP).

In an embodiment of the present invention, there is introduced a User Equipment (UE) comprising:

a multiple input-multiple output (MIMO) antenna;

means for receiving a demodulation reference signal (DMRS) vector in frequency domain (21);

means for estimating raw channel estimates vector (23) from the received DMRS vector in frequency domain (21);

means for calculating a derivative vector (25) of the raw channel estimates vector (23);

means for determining a second order statistics estimation (28), by calculating variance of the derivative vector (25) of the raw channel estimates vector (23) and by calculating variance of noise estimation (26), and by subtracting the calculated variance of noise estimation (26) from the calculated variance of the derivative vector (25) of the raw channel estimates vector (23);

means for estimating a root mean square (RMS) delay spread (29) for each radio path, from the determined second order statistics estimation (28); and means for estimating a Power Delay Profile (PDP) by comparison between the estimated RMS delay spread and predetermined RMS delay spread thresholds.

In an embodiment of the UE, the UE comprises:

means for calculating the variance of noise estimation (26) by subtraction of a reconstituted signal with a received signal.

In an embodiment of the UE, the means for estimating an RMS delay spread (29) for each radio path is configured to estimate the RMS delay spread (29) by $$\text{rms\_ds} \cong \frac{\sqrt{v}}{2\pi\Delta F},$$

where V is the determined second order statistics estimation (28), and ΔF is the single carrier spacing in Hz.

In an embodiment of the UE, the UE comprises:

means for calculating the raw channel estimates vector (23) for each TX/RX radio path k and on each DMRS position of an allocated Physical Resource Block (PRB) according to the following formula:

$$H\_RAW\_DMRS_{k,i} = r_{k,i} s_{k,i}^* \text{ for } i=0{:}nDMRS-1 \text{ and } k=0{:}nTX*nRX-1$$

where nDMRS is the number of DMRS in all allocated PRB, and where $r_{k,i}$ is the received sample DMRS in (k,i) position and $s_{k,i}^*$ is the conjugate of known DMRS symbol in (k,i) position.

In an embodiment of the UE,
in case of more than one transmission antenna and one reception antenna yielding k>1, H_RAW_DMRS [i] of each radio path k are concatenated yielding nDMRS=nDMRS*k, thus obtaining the raw channel estimates vector (23).

In an embodiment of the UE, the UE comprises:
means for calculating the derivative vector (25) of the raw channel estimates vector (23) by making the difference between two DMRS:s over the resulting distance, DMRS after DMRS.

In an embodiment of the UE, the UE comprises:
means for calculating the derivative vector (25) of the raw channel estimates vector (23) for each radio path k by:

$$\alpha[i] = (H\_RAW\_DMRS[M+i] - H\_RAW\_DMRS[i])/N \text{ for } i=0{:}nMeas-1$$

wherein N is the number of resource elements between two DMRS:s dedicated for measurements, and wherein M=N/2=the distance between two DMRS:s dedicated for the measurement of the frequency drift, and wherein nMeas is the number of measurements=nDMRS−M, which is also the length of the derivative vector (25) of the raw channel estimates vector (23) on each radio path k.

In an embodiment of the UE, the UE comprises:
the means for determining the second order statistics estimation (28), where the second order statistics estimation (28) corresponds to the variance of the derivative vector (25) of the raw channel estimates vector (23) by:

$$V = \frac{1}{nMeas} \sum_{i=0}^{i=nMeas-1} |\alpha_i - \bar{\alpha}|^2 - \widetilde{no}$$

wherein V is the determined second order statistics estimation (28), and [α] is the derivative vector (25) resulting from the derivative operator (24), and $\bar{\alpha}$ is the mean value, and $\widetilde{no}$ is the variance of noise estimation (26).

In an embodiment of the UE, the UE comprises:
means for performing Minimum Mean Square Error (MMSE) or Linear Minimum Mean Square Error (LMMSE) based channel estimation based on the estimated Power Delay Profile (PDP).

According to a further aspect of the present invention, there is provided an apparatus comprising at least one processor; and at least one memory storing instructions that, when executed by the at least one processor, cause the apparatus at least to perform the method of the third aspect of the present invention, or an embodiment thereof.

According to some further aspects, there is provided a computer program, a computer program product, a computer readable medium, or a non-transitory computer readable medium comprising program instructions for causing an apparatus to perform the method according to any one of the above-mentioned aspects or according to an embodiment thereof.

In general, the various embodiments of the present invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The term "non-transitory," as used herein, is a limitation of the medium itself (i.e., tangible, not a signal) as opposed to a limitation on data storage persistency (e.g., RAM vs. ROM).

The foregoing description has provided by way of exemplary and non-limiting examples a full and informative description of the exemplary embodiments of the present invention. However, various modifications and adaptations may become apparent to those skilled in the relevant arts in view of the foregoing description, when read in conjunction with the accompanying drawings and the appended examples. However, all such and similar modifications of the teachings of the present invention will still fall within the scope of the present invention, represented by the appended claims.

In other words: While the foregoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the present invention. Accordingly, it is not intended that the present invention be limited, except as by the claims set forth below.

Yet in other words, the present invention is not restricted merely to the embodiments presented above, but the present invention may vary within the scope of the claims.

LIST OF ABBREVIATIONS

BLER Block Error Rate
CDF Cumulative Distribution Function
CIR Channel Impulse Response
DMRS Demodulation Reference Signal
DS Delay Spread
gNB gNodeB 5G New Radio
IFFT Inverse Fast Fourier Transform
ISI Intersymbol Interference
LCR Level Crossing Rate
LMMSE Linear Minimum Mean Square Error
PDP Power Delay Profile
PRB Physical Resource Block
RE Resource Element
RMS Root Mean Square
SCS Single Carrier Spacing
SNR Signal-to-Noise Ratio
TTI Transmission Time Interval

The invention claimed is:

1. An apparatus comprising:
a multiple input-multiple output (MIMO) antenna;
means for receiving a demodulation reference signal (DMRS) vector in frequency domain;
means for estimating raw channel estimates vector from the received DMRS vector in frequency domain;
means for calculating a derivative vector of the raw channel estimates vector;

means for determining a second order statistics estimation, by calculating variance of the derivative vector of the raw channel estimates vector and by calculating variance of noise estimation, and by subtracting the calculated variance of noise estimation from the calculated variance of the derivative vector of the raw channel estimates vector;

means for estimating a root mean square (RMS) delay spread for each radio path, from the determined second order statistics estimation; and means for estimating a Power Delay Profile (PDP) by comparison between the estimated RMS delay spread and predetermined RMS delay spread thresholds.

2. The apparatus according to claim 1, wherein the apparatus comprises means for calculating the variance of noise estimation by subtraction of a reconstituted signal with a received signal.

3. The apparatus according to claim 1, wherein the means for estimating an RMS delay spread for each radio path is configured to estimate the RMS delay spread by $$\text{rms\_ds} \cong \frac{\sqrt{v}}{2\pi \Delta F},$$

where V is the determined second order statistics estimation and $\Delta F$ is the single carrier spacing in Hz.

4. The apparatus according to claim 1, wherein the apparatus comprises means for calculating the raw channel estimates vector for each TX/RX radio path k and on each DMRS position of an allocated Physical Resource Block (PRB) according to the following formula:

$H\_RAW\_DMRS_{k,i} = r_{k,i} s_{k,i}^*$ for $i=0$:nDMRS−1 and $k=0$:nTX*nRX−1 where nDMRS is the number of DMRS in all allocated PRB, and where $r_{k,i}$ is the received sample DMRS in (k,i) position and $s_{k,i}^*$ is the conjugate of known DMRS symbol in (k,i) position.

5. The apparatus according to claim 4, wherein in case of more than one transmission antenna and one reception antenna yielding k>1, H_RAW_DMRS [i] of each radio path k are concatenated yielding nDMRS=nDMRS*k, thus obtaining the raw channel estimates vector.

6. The apparatus according to claim 5, wherein the apparatus comprises means for calculating the derivative vector of the raw channel estimates vector by making the difference between two DMRS:s over the resulting distance, DMRS after DMRS.

7. The apparatus according to claim 6, wherein the apparatus comprises means for calculating the derivative vector of the raw channel estimates vector for each radio path k by:

$\alpha[i] = (H\_RAW\_DMRS[M+i] - H\_RAW\_DMRS[i])/N$ for $i=0$:nMeas−1 wherein N is the number of resource elements between two DMRS:s dedicated for measurements, and wherein M=N/2=the distance between two DMRS:s dedicated for the measurement of the frequency drift, and wherein nMeas is the number of measurements=nDMRS−M, which is also the length of the derivative vector of the raw channel estimates vector on each radio path k.

8. The apparatus according to claim 7, wherein the apparatus comprises the means for determining the second order statistics estimation, where the second order statistics estimation corresponds to the variance of the derivative vector of the raw channel estimates vector (23) by:

$$V = \frac{1}{nMeas} \sum_{i=0}^{i=nMeas-1} |\alpha_i - \overline{\alpha}|^2 - \widetilde{no},$$

wherein V is the determined second order statistics estimation, and $[\alpha]$ is the derivative vector resulting from the derivative operator, and $\overline{\alpha}$ is the mean value, and $\widetilde{no}$ is the variance of noise estimation.

9. The apparatus according to claim 1, wherein the apparatus comprises means for performing Minimum Mean Square Error (MMSE) or Linear Minimum Mean Square Error (LMMSE) based channel estimation based on the estimated Power Delay Profile (PDP).

10. An apparatus comprising:
at least one processor; and
at least one memory
storing instructions that, when executed by the at least one processor, cause the apparatus at least to:

transmit and/or receive wireless signals via a multiple input-multiple output (MIMO) antenna;

receive a demodulation reference signal (DMRS) vector in frequency domain;

estimate raw channel estimates vector from the received DMRS vector in frequency domain;

calculate a derivative vector of the raw channel estimates vector;

determine a second order statistics estimation, by calculating variance of the derivative vector of the raw channel estimates vector and by calculating variance of noise estimation, and by subtracting the calculated variance of noise estimation from the calculated variance of the derivative vector of the raw channel estimates vector;

estimate a root mean square (RMS) delay spread for each radio path, from the determined second order statistics estimation; and estimate a Power Delay Profile (PDP) by comparison between the estimated RMS delay spread and predetermined RMS delay spread thresholds.

11. The apparatus according to claim 10, wherein the apparatus is further caused to:

calculate the variance of noise estimation by subtraction of a reconstituted signal with a received signal.

12. The apparatus according to claim 10, wherein the estimating an RMS delay spread for each radio path is configured to estimate the RMS delay spread by $$\text{rms\_ds} \cong \frac{\sqrt{v}}{2\pi \Delta F},$$

where V is the determined second order statistics estimation, and $\Delta F$ is the single carrier spacing in Hz.

13. The apparatus according to claim 10, wherein the apparatus is further caused to:

calculate the raw channel estimates vector for each TX/RX radio path k and on each DMRS position of an allocated Physical Resource Block (PRB) according to the following formula:

$$H\_RAW\_DMRS_{k,i} = r_{k,i} s_{k,i}^* \text{ for } i=0:nDMRS-1 \text{ and}$$
$$k=0:nTX*nRX-1$$

where nDMRS is the number of DMRS in all allocated PRB, and where $r_{k,i}$ is the received sample DMRS in (k,i) position and $s_{k,i}^*$ is the conjugate of known DMRS symbol in (k,i) position.

14. The apparatus according to claim 13, wherein
in case of more than one transmission antenna and one reception antenna yielding k>1, H_RAW_DMRS [i] of each radio path k are concatenated yielding nDMRS=nDMRS*k, thus obtaining the raw channel estimates vector.

15. The apparatus according to claim 14, wherein the apparatus is further caused to:
calculate the derivative vector of the raw channel estimates vector by making the difference between two DMRS:s over the resulting distance, DMRS after DMRS.

16. The apparatus according to claim 15, wherein the apparatus is further caused to:
calculate the derivative vector of the raw channel estimates vector for each radio path k by:

$$\alpha[i] = (H\_RAW\_DMRS[M+i] - H\_RAW\_DMRS[i])/N$$
$$\text{for } i=0:nMeas-1$$

wherein N is the number of resource elements between two DMRS:s dedicated for measurements, and wherein M=N/2=the distance between two DMRS:s dedicated for the measurement of the frequency drift, and wherein nMeas is the number of measurements=nDMRS−M, which is also the length of the derivative vector of the raw channel estimates vector on each radio path k.

17. The apparatus according to claim 16, wherein the apparatus is further caused to:
determine the second order statistics estimation, where the second order statistics estimation corresponds to the variance of the derivative vector of the raw channel estimates vector by:

$$V = \frac{1}{nMeas} \sum_{i=0}^{i=nMeas-1} |\alpha_i - \overline{\alpha}|^2 - \widehat{n\sigma}$$

wherein V is the determined second order statistics estimation, and [α] is the derivative vector resulting from the derivative operator, and $\overline{\alpha}$ is the mean value, and $\widehat{n\sigma}$ is the variance of noise estimation.

18. The apparatus according to claim 10, wherein the apparatus is further caused to:
perform Minimum Mean Square Error (MMSE) or Linear Minimum Mean Square Error (LMMSE) based channel estimation based on the estimated Power Delay Profile (PDP).

19. A method, comprising the steps of:
transmitting and/or receiving wireless signals via a multiple input-multiple output (MIMO) antenna;
receiving a demodulation reference signal (DMRS) vector in frequency domain;
estimating raw channel estimates vector from the received DMRS vector in frequency domain;
calculating a derivative vector as of the raw channel estimates vector;
determining a second order statistics estimation, by calculating variance of the derivative vector of the raw channel estimates vector and by calculating variance of noise estimation, and by subtracting the calculated variance of noise estimation from the calculated variance of the derivative vector of the raw channel estimates vector;
estimating a root mean square (RMS) delay spread for each radio path, from the determined second order statistics estimation; and
estimating a Power Delay Profile (PDP) by comparison between the estimated RMS delay spread and predetermined RMS delay spread thresholds.

20. A non-transitory computer readable medium comprising program instructions stored thereon for performing at least the following:
transmitting and/or receiving wireless signals via a multiple input-multiple output (MIMO) antenna;
receiving a demodulation reference signal (DMRS) vector in frequency domain;
estimating raw channel estimates vector from the received DMRS vector in frequency domain;
calculating a derivative vector of the raw channel estimates vector;
determining a second order statistics estimation, by calculating variance of the derivative vector of the raw channel estimates vector and by calculating variance of noise estimation, and by subtracting the calculated variance of noise estimation from the calculated variance of the derivative vector of the raw channel estimates vector;
estimating a root mean square (RMS) delay spread for each radio path, from the determined second order statistics estimation; and
estimating a Power Delay Profile (PDP) by comparison between the estimated RMS delay spread and predetermined RMS delay spread thresholds.

* * * * *